(12) United States Patent
Davidovici et al.

(10) Patent No.: US 6,349,110 B1
(45) Date of Patent: *Feb. 19, 2002

(54) SUBSYSTEM AND METHOD FOR COMBINING SPREAD-SPECTRUM MULTIPATH SIGNALS

(75) Inventors: Sorin Davidovici, Jackson Heights, NY (US); Jimmy Cuong Tran, Jackson, NJ (US); Donald L. Schilling, Sands Point, NY (US)

(73) Assignee: Golden Bridge Technology, Inc., West Long Branch, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/296,508

(22) Filed: Apr. 22, 1999

Related U.S. Application Data

(63) Continuation of application No. 08/806,013, filed on Feb. 24, 1997, now Pat. No. 5,956,369.

(51) Int. Cl.[7] .......................... H04B 15/00; H04K 1/00; H04L 27/30
(52) U.S. Cl. ....................................... 375/207; 375/206
(58) Field of Search .................. 375/207, 206

(56) References Cited

U.S. PATENT DOCUMENTS

| | | | |
|---|---|---|---|
| 4,694,467 A | * | 9/1987 | Mui ........................... 375/200 |
| 4,894,842 A | | 1/1990 | Broekhoven et al. |
| 5,081,643 A | | 1/1992 | Schilling |
| 5,109,390 A | | 4/1992 | Gilhousen et al. |
| 5,278,862 A | | 1/1994 | Vander Mey |
| 5,513,221 A | * | 4/1996 | Parr et al. .................... 375/344 |
| 5,627,855 A | * | 5/1997 | Davidovici ................. 375/207 |
| 5,696,789 A | | 12/1997 | Jones et al. |
| 5,715,267 A | | 2/1998 | Tran et al. |
| 5,715,276 A | * | 2/1998 | Tran et al. .................. 375/207 |
| 5,764,691 A | | 6/1998 | Hennedy et al. |

* cited by examiner

Primary Examiner—Chi Pham
Assistant Examiner—Tony Al-Beshrawi
(74) Attorney, Agent, or Firm—David Newman Chartered (57) ABSTRACT

A subsystem and method for combining a spread-spectrum signal arriving from a plurality of paths. A header-matched filter detects each match of a header-chip-sequence signal with a first impulse response and, in response to the detection, outputs a header-detection signal having a header amplitude and a respective chip location. A data-matched filter detects, at the respective chip location of each header-detection signal, a respective data-chip-sequence signal and outputs a data-detection signal having a data amplitude. A combiner multiplies the header amplitude of each header-detection signal and the data amplitude of the respective data symbol to generate a plurality of weighted elements for each data symbol. The combiner then adds the plurality of weighted elements for each data symbol as a sum signal of the respective data symbol.

16 Claims, 4 Drawing Sheets

SUBSYSTEM AND METHOD FOR COMBINING SPREAD-SPECTRUM MULTIPATH SIGNALS

RELATED PATENT

This patent stems from a continuation application of U.S. patent application Ser. No. 08/806,013, filed Feb. 24, 1997 entitled SPREAD SPECTRUM MULTIPATH COMBINING SUBSYSTEM AND METHOD, now U.S. Pat. No. 5,956,369. The benefit of the earlier filing dates of the parent patent applications are claimed for common subject matter pursuant to 35 U.S.C. §120.

BACKGROUND OF THE INVENTION

The present invention relates to spread-spectrum communication systems, and more particularly to a multipath-combining subsystem and method for use with a spread-spectrum receiver which can receive a spread-spectrum signal arriving from a plurality of paths.

DESCRIPTION OF THE RELEVANT ART

Figures 1, 2:
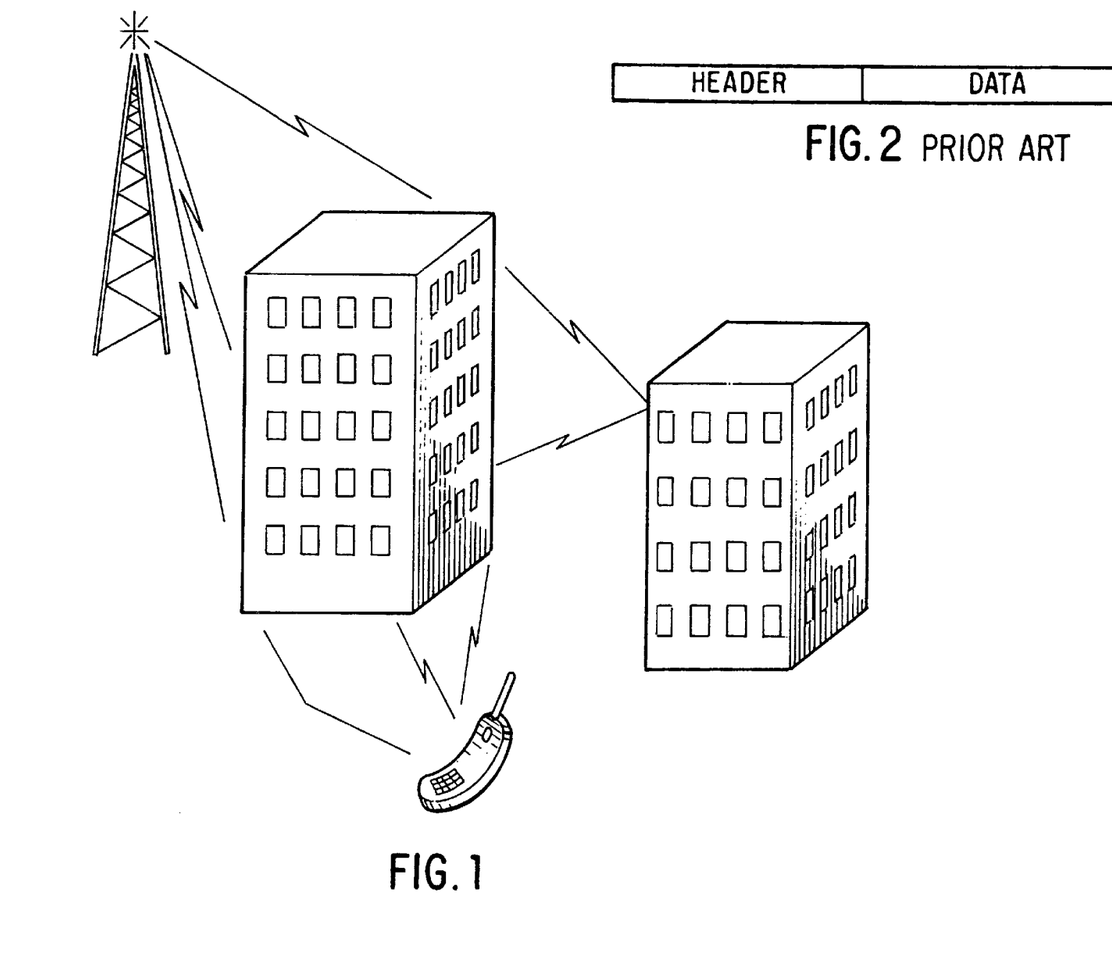
FIG. 1 illustrates multipath between a spread-spectrum transmitter and a spread-spectrum remote unit, with the paths bouncing off buildings.
FIG. 2 illustrates a packet, having a header and a data portion.

In spread-spectrum environments, multipath presents a problem in terms of synchronization and signal reliability. Typically, a spread-spectrum signal is transmitted from a transmitter and, as shown in FIG. 1, can be reflected from a number of surfaces, such as buildings, mountains, trees, trucks, etc. In the microwave region, the multipath problem is more acute, due to the propagation characteristics of microwaves.

A RAKE system can be used for selecting the strongest path in a multipath system. Such a system is described in U.S. Pat. No. 5,081,643. When using matched filters, a different problem arises. For each path of a multipath signal, a match of the chip sequence within the spread-spectrum signal may occur within the matched filter, producing an output. While the strongest output might be chosen, the subsequent outputs may have power levels close to the strongest output or at least sufficiently strong to cause false triggers and other problems.

Multipath can be aggravated by the time varying nature of propagation characteristics due to motion of a vehicle, a receiver, a transmitter, and objects from which reflections may occur. Thus, while the strong path may be locked onto at one point in time, the strong path may move in time to a different path due to the multipath environment.

SUMMARY OF THE INVENTION

A general object of the invention is a subsystem and method for receiving a spread-spectrum signal arriving at different times from a plurality of paths.

Another object of the invention is a subsystem and method which, in place of selecting the strongest signal, instead enhances reception of a multipath signal by combining power from the various paths.

According to the present invention, as embodied and broadly described herein, a multipath-combining subsystem and method for use with a spread-spectrum receiver for receiving a spread-spectrum signal is provided. The spread-spectrum signal is assumed to be arriving at different times, from a plurality of paths. The plurality of paths typically might be due to reflections of the spread-spectrum signal off of buildings, automobiles, and other objects which may be found in the environment.

The spread-spectrum signal has a plurality of packets, with each packet having a header followed by a data portion. The header includes a header-chip-sequence signal. The data portion includes a data-symbol-sequence signal, with each data symbol of the data-symbol-sequence signal spread-spectrum processed by a data-chip-sequence signal.

The multi path-combining subsystem includes matched-filter means, a header memory, and a combiner. The matched-filter means may be embodied as a header-matched filter in parallel with a data-matched filter, or alternatively, as a programmable-matched filter. For the first embodiment, the header-matched filter has a first impulse response matched to the header-chip-sequence signal, and the data-matched filter has a second impulse response matched to the data-chip-sequence signal. For the second embodiment, the programmable-matched filter initially has the first impulse response matched to the header-chip-sequence signal, and subsequently has the second impulse response matched to the data-chip-sequence signal.

The following discussion uses, by way of example, the header-matched filter and data-matched filter. The programmable-matched filter can accomplish the same function as the header-matched filter and the data-matched filter, by having the impulse response of the programmable-matched filter change from the first impulse response to the second impulse response, thereby matching the header-chip-sequence signal and the data-chip-sequence signal, respectively.

The header-matched filter detects, within a packet and for each path of the spread-spectrum signal, each match of the header-chip-sequence signal with the first impulse response. The detection is compared to a threshold, denoted herein as the header threshold, and when the header threshold is met, the header-matched filter outputs a header-detection signal. The header-detection signal has a header amplitude, and a respective chip location with respect to the header-chip-sequence signal.

The time difference between the receipt of each path of the spread-spectrum signal is assumed to be greater than the time of each chip of the header-chip-sequence signal, and greater than the time of each chip of the data-chip-sequence signal.

The header memory stores the header amplitude of each header-detection signal and the respective chip location of each header-detection signal.

The data-matched filter detects, at each respective chip location of each header-detection signal for each path, each match of the data-chip-sequence signal with the second impulse response. The data-matched filter outputs, in response to each detected match, a data-detection signal. Each data-detection signal has a data amplitude.

The combiner, which typically includes a memory and adder gates, multiplies the header amplitude of each header-detection signal by the data amplitude of each data-detection signal, at each corresponding chip location, respectively. The multiplication generates a plurality of weighted elements for each data symbol. The combiner then adds the plurality of weighted elements for each data symbol to generate a sum signal. The sum signal typically is detected by a detector and outputted as data.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference now is made in detail to the present preferred embodiments of the invention, examples of which are illustrated in the accompanying drawings, wherein like reference numerals indicate like elements throughout the several views.

The present invention provides a new and novel spread-spectrum multipath-combining subsystem and method which can be used as part of a spread-spectrum receiver on a received spread-spectrum signal. The received spread-spectrum signal, in a preferred embodiment, is assumed to include a plurality of packets. Each packet, illustratively shown in FIG. 2, has a header followed in time by a data portion. The header includes a header-chip-sequence signal. The header alternatively may be generated from spread-spectrum processing, by using techniques well known in the art, a header-symbol-sequence signal with a header-chip-sequence signal. The header-symbol-sequence signal is a predefined sequence of symbols. The header-symbol-sequence signal may be alternating 1-bits and 0-bits or alternating symbols, a pseudorandom sequence of symbols, or other predefined sequence of symbols as desired. The header-chip-sequence signal is user defined and, in a usual practice, is generated from a pseudorandom sequence of chips. Typically, the header includes only the header-chip-sequence signal, without spread-spectrum processing with a header-symbol-sequence signal. The header-chip-sequence signal has a large processing gain for improved header detection.

The data portion of the spread-spectrum packet of FIG. 2 is generated similarly, from techniques well known in the art, by spread-spectrum processing a data-symbol signal or a data-symbol-sequence signal with the data-chip-sequence signal. A data-symbol signal includes a single data symbol, whereas a symbol-sequence signal includes a sequence of data symbols. The term "data-symbol-sequence signal" is used hereinafter to include both, a data-symbol signal and a data-symbol-sequence signal.

The data-symbol-sequence signal may be derived from data, or an analog signal converted to data, signalling information, or other source of data symbols or bits. The data-chip-sequence signal can be user defined, and preferably is nearly orthogonal to other spread-spectrum channels using the chip-sequence signal, as is well known in the art. The data-chip-sequence signal typically is different from the header-chip-sequence signal, although they may be the same. In the preferred embodiment, the data-chip-sequence signal has a significantly smaller processing gain than the header-chip-sequence signal.

The terms "header-chip-sequence signal" and "data-chip-sequence signal" denote signals having a chip sequence, used for the header and data portion of the packet, respectively. The terms "header-symbol-sequence signal" and "data-symbol-sequence signal" denote signals having a symbol sequence, used for the header and data portion of the packet, respectively.

The received spread-spectrum signal is complex, i.e., it has in-phase and quadrature-phase components. The discussion herein refers to signals which are complex. Reference to the signals disclosed herein is assumed to refer to complex signals The invention alternatively may operate on only a real component or on an imaginary component of the complex signal.

Figure 3:
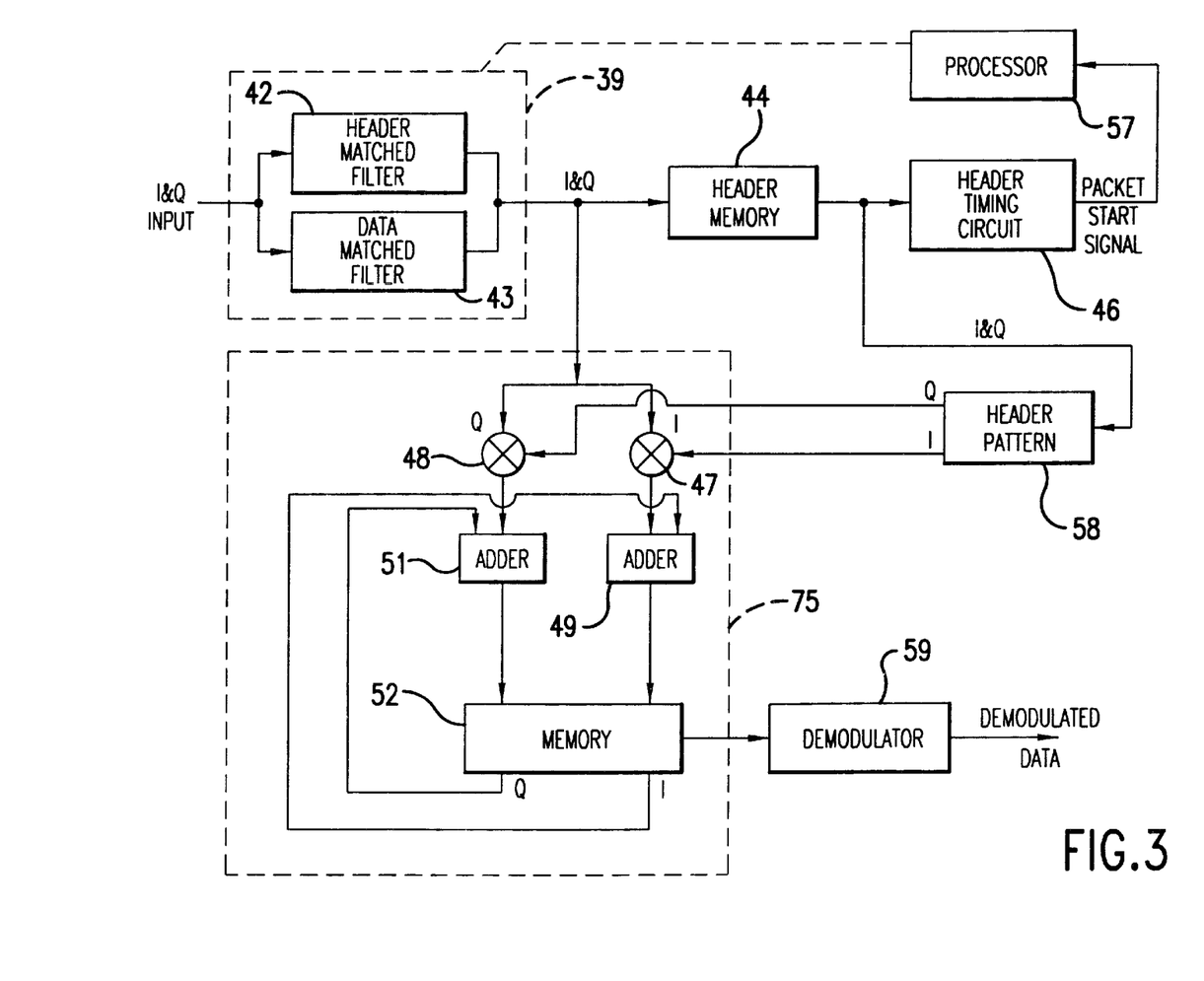
FIG. 3 is a block diagram of the multipath-combining subsystem.

In the exemplary arrangement shown in FIG. 3, a multipath-combining subsystem for use with the spread-spectrum receiver for receiving a spread-spectrum signal is provided. The spread-spectrum signal is assumed to be arriving at different times, from a plurality of paths. The spread-spectrum signal has a plurality of packets. The plurality of packets may arrive continuously, each packet may be separated in time from the other packets, or the plurality of packets may arrive as a combination of continuous and separated in time.

The multipath-combining subsystem comprises matched-filter means, header-memory means, and combining means. The matched-filter means is coupled to the spread-spectrum receiver. The header-memory means is coupled to the matched-filter means. The combining means is coupled to the header-memory means and to the matched-filter means.

The matched-filter means, which can have means for filtering in-phase and quadrature-phase components, has a first impulse response matched to the header-chip-sequence signal of the header embedded in the spread-spectrum signal. The first impulse response is for detecting, within a packet and for each path of the spread-spectrum signal, each match of the header-chip-sequence signal with the first impulse response. The detection preferably includes matching the in-phase component and the quadrature-phase component of the header-chip-sequence signal with the first impulse response. To detect a match, the level of correspondence between the header-chip-sequence signal and the first impulse response must go above a threshold, denoted herein as the header threshold. In an analog context, the header threshold may be a specified voltage. In a digital the header threshold may be a specified number of chips that must correspond in order for a "match" to have occurred. Other well known threshold measurement embodiments may also be employed. When the header threshold is met, the matched-filter means outputs a signal which is denoted as a header-detection signal. The header-detection signal has a header amplitude and a respective chip location with respect to the header-chip-sequence signal.

The matched-filter means outputs, in response to each detected match of each occurrence of the header-chip-sequence signal within the packet with the first impulse response in the matched-filter means, a header detection signal having a header amplitude and a respective chip location of the header-detection signal. By using the chip location of the header-detection signal and a header-chip-sequence signal having a large processing gain, a data-chip-sequence signal with a much smaller processing gain can be used. That is because the chip location identifies where, within each path of the arriving spread-spectrum signal, to look for the data-chip-sequence signal. By narrowing the target window, and weighting the data-detection signal with the header amplitude, the gain requirement of the data-chip-sequence signal may be greatly reduced. The effect of this invention is analogous to coherent detection and integration of the spread-spectrum signal arriving from the plurality of paths.

By way of example, when the header-chip sequence has 1024 chips, i.e., a processing gain of 30 dB, and the data-chip-sequence signal has 256 chips, i.e., a processing gain of 23 dB, reliable data communications may be maintained. The header, by its large processing gain, provides reliable timing. The reliability of the data can be increased by using error correction coding techniques with the data-symbol-sequence signal. This presents a major cost advantage as the data-matched filter is less expensive than the header-matched filter, since the data-matched filter requires fewer adders, gates, etc.

Within a packet, the matched-filter means may produce a multiplicity of header-detection signals. The location of each header-detection signal corresponds to a chip location within the header-chip-sequence signal, relative to a first header-detection signal detected within the packet. The use of chip location for relating the position of a header-detection signal detected later than the first header-detection signal within a packet, is by way of example. Other techniques for relating a position in time of a later detected header-detection signal from the first header-detection signal, such as a clock or timing signal, are equivalent to the use of chip location, as used herein. The term "chip location" is used hereinafter with the understanding that this term includes other equivalent clock or timing signal techniques.

The header-memory means, which can include means for storing in-phase and quadrature-phase components of the header-detection signal, stores the amplitude of each header-detection signal, which may include the amplitude for the in-phase component and the amplitude for the quadrature-phase component, and the respective chip location, or position in time, of each header-detection signal.

The matched-filter means also has a second impulse response matched to the data-chip-sequence signal of the data portion embedded in the spread-spectrum signal. The matched-filter means, using the second impulse response, detects, at each respective chip location, or time position, of each header-detection signal for each path, each match of the data-chip-sequence signal with the second impulse response. This preferably includes detecting the in-phase component and the quadrature-phase component of the data-chip-sequence signal with the second impulse response. For each data symbol of the data-symbol-sequence signal within a packet, there is a set of matches with the data-chip-sequence signal, preferably including the matching of the in-phase component and the quadrature-phase component of the data-chip-sequence signal, with the second impulse response. The location of each match within the set corresponds to the respective chip location of each header-detection signal for each path. A threshold requirement may be introduced but is not necessary.

By using the chip locations of the header-detection signals, the time for detecting each match of the data-chip-sequence signal is limited to the time needed to check those chip locations. In other words, the chip locations of the header-detection signals of the header of the packet are used to identify detection periods. This targeting eliminates false alarms by eliminating the blanket review of all chic locations including chip locations or times that do not correspond to the timing of header-detection signal output.

The matched-filter means outputs, in response to each detected match, a data-detection signal having a data amplitude and corresponding chip location. The data-detection signal for complex signals has an in-phase-data amplitude and a quadrature-phase-data amplitude. Thus, the data amplitude can have an in-phase component and a quadrature-phase component.

The combining means, which can include means for combining in-phase and quadrature-phase components, multiplies, for each packet, the header amplitude, including in-phase and quadrature-phase components, for a particular chip location or time position, of each header-detection signal, including in-phase and quadrature-phase components, respectively, by the data amplitude of each data-detection signal, including in-phase and quadrature-phase components, respectively, at each corresponding chip location or time position, respectively. The chip location or time position may serve as an index for matching the header amplitude of each header-detection signal with the data amplitude of each data-detection signal. The header amplitude serves a weighting function. A greater header amplitude increases the magnitude of the corresponding data-detection signal such that stronger signals are given greater weight than weaker signals, with the result being more accurate data detection. The combining means generates a plurality of weighted elements from the plurality of data-detection signals, for each data symbol of the data-symbol-sequence signal within the data portion of the packet. The combining means adds the plurality of weighted elements for each data symbol, to generate a sum signal of the respective data symbol.

The combining means may further include product means, a combiner memory, and adding means. The product means multiplies the plurality of header amplitudes (in-phase and quadrature-phase components) of the plurality of header-detection signals by the plurality of data amplitudes (in-phase and quadrature-phase components, respectively) of the plurality of data-detection signals, respectively. The multiplication takes place at corresponding chip locations of the header-detection signals, respectively. The product means thereby generates a plurality of weighted elements having in-phase and quadrature-phase components for each data symbol of the data-symbol-sequence signal within the data portion of the packet.

The combiner memory stores the plurality of weighted elements.

The adding means adds each element of the plurality of weighted elements, for each data symbol, as the sum signal of the respective data symbol.

The present invention may further include a demodulator coupled to the combining means for detecting data from the sum signal.

Additionally, the present invention may further include a header-timing circuit for detecting, from a plurality of header-detection signals, a strongest header-detection signal and, in response to the strongest header-detection signal, for outputting a packet-start signal. In response to the packet-start signal, the matched-filter means changes from the first impulse response to the second impulse response. A processor may be inserted between the header-timing circuit and the matched-filter means. The processor can provide additional control of the timing for when the matched-filter means changes from the first impulse response to the second impulse response.

In the exemplary arrangement shown in FIG. 3, the matched-filter means may be embodied as a header-matched filter 42 and a data-matched filter 43. For filtering in-phase and quadrature-phase components, the header-matched filter 42 may include an in-phase-header-matched filter and a quadrature-phase-header-matched filter, and the data-matched-filter 43 may include an in-phase-data-matched filter and a quadrature-phase-data-matched filter. The following discussion refers to the header-matched filter 42 and the data-matched filter 43, for filtering the in-phase and quadrature-phase components of the received spread-spectrum signal.

The header-memory means may be embodied as a header memory 44. The combining means may be embodied as a combiner 75.

As shown in FIG. 3, the header-matched filter 42 is coupled to the spread-spectrum receiver. The data-matched filter 43 is also coupled to the spread-spectrum receiver. The header memory 44 is coupled to the header-matched filter 42. A header-timing circuit 46 is coupled to the output of the header-matched filter 42, through the header memory 44. The combiner 75 is coupled to the header memory 44 and to the data-matched filter 43.

The header-matched filter 42 has a first impulse response matched to the header-chip-sequence signal of the header embedded in the spread-spectrum signal. The header-matched filter 42 detects within each packet, and for each path of the spread-spectrum signal, each match of the header-chip-sequence signal with the first impulse response. The "detection" requires that the match between the header-chip-sequence signal and the first impulse response have a level of correspondence above the header threshold. This "level of correspondence" may, in an analog context, be reflected by a specified voltage level or, in a digital context, may arise in response to a specified number of matching chips. When the header threshold has been met, the header-matched filter 42 outputs a header-detection signal. The header-detection signal has a header amplitude and a respective chip location. A time difference between receiving each path of the spread-spectrum signal is assumed to be greater than a time of each chip of the header-chip-sequence signal, and greater than a time of each chip of the data-chip-sequence signal.

The header memory 44 stores the header amplitude and the respective chip location of each header-detection signal.

The data-matched filter 43 detects, at each respective chip location of each header-detection signal for each path, each match of the data-chip-sequence signal with a second impulse response. When there is a match, the data-matched filter 43 outputs a data-detection signal having a data amplitude.

The header-timing circuit 46 detects, from a plurality of header-detection signals, a strongest header-detection signal. In response to detecting the strongest header-detection signal, the header-timing circuit 46 outputs a packet-start signal.

The matched-filter means alternatively may be embodied as a programmable-matched filter 39. The programmable-matched filter 39 is coupled to the spread-spectrum receiver and to the header-memory 44. The programmable-matched filter 39 preferably includes an in-phase-programmable-matched filter and a quadrature-phase-programmable-matched filter. The discussion refers to programmable-matched filter 39, as a preferred embodiment, including the in-phase and quadrature-phase programmable-matched filters.

The programmable-matched filter 39 has a first impulse response initially matched to the header-chip-sequence signal of the header embedded in the spread-spectrum signal. The programmable-matched filter detects, within each packet and for each path of the spread-spectrum signal, each match of the header-chip-sequence signal with a first impulse response. For a valid detection, the match must have a level of correspondence between the header-chip-sequence signal and the first impulse response above the header threshold. The header threshold may be adjusted to adapt to particular environmental situations. In response to a valid detection, the programmable-matched filter 39 outputs a header-detection signal having a header amplitude and a respective chip location of the header-detection signal.

In response to the packet-start signal from the header-timing circuit 46 and, if required, with further timing or control from processor 57, the programmable-matched filter 39 is changed from the first impulse response to the second impulse response. At each respective chip location of each header-detection signal for each path, the programmable-matched filter 39 detects each match of the data-chip-sequence signal with the second impulse response. In response to each detected match, the programmable-matched filter 39 outputs a data-detection signal having a data amplitude.

The combiner 75, which can include means for combining in-phase and quadrature-phase components, multiplies, for each packet, each header amplitude, including in-phase and quadrature-phase components, for a particular chip location or time position, of each header-detection signal, including in-phase and quadrature-phase components, respectively, by each data amplitude of each data-detection signal, including in-phase and quadrature-phase components, respectively, at each corresponding chip location or time position, respectively. The chip location or time position may serve as an index for matching the header amplitude of each header-detection signal with the data amplitude of each data-detection signal.

By using the chip locations of the header-detection signals, the time needed to detect each match of the data-chip-sequence signal is reduced in that matches are only looked for at those chip locations. For a data symbol of the data-symbol-sequence signal within the data portion of the packet, using the chip locations of the header-detection signals eliminates many false alarms because there is no attempt to detect the data-chip-sequence signal at chip locations or times that do not correspond to the timing of the header-detection signal output. Furthermore, by using a header-chip-sequence signal having a large processing gain, in combination with the chip locations of the header-detection signal, a data-chip-sequence signal with a much smaller processing gain may be used, reducing the cost of the receiver.

The header amplitude serves a weighting function. A header-detection signal having a large amplitude indicates that the match between the header-chip-sequence signal and the first impulse response was high. In a digital context, for example, a header-detection signal having a large amplitude would indicate that a large percentage of the possible matching chips were matched. A data-detection signal arising from the detection of a data-chip-sequence signal at the chip location corresponding to the header-detection signal with the large amplitude would therefore be more reliable than a data-detection signal arising from the detection of a data-chip-sequence signal at a chip location corresponding to a header-detection signal with a smaller amplitude. To maximize the more reliable data-detection signal, the amplitude of the header-detection signal is multiplied with the data-detection signal to weight the data-detection signal more heavily. Conversely, the less reliable data-detection signal is weighted by multiplication with the smaller amplitude of its corresponding header-detection signal. The result is an increased reliance on the most reliable signals arriving at the receiver.

Following the weighting process, the combiner generates an in-phase sum and a quadrature-phase sum which are outputted to demodulator 59. The demodulator 59 demodulates the in-phase sum and the quadrature-phase sum as demodulated data.

As shown in FIG. 3, the combiner may further include product means, a combiner memory 52, and adding means. The product means may be embodied as an in-phase-product device 47 and a quadrature-phase product device 48. The adder means may be embodied as an in-phase adder 49 and a quadrature-phase adder 51. The in-phase adder 49 is coupled between the in-phase-product device 47 and the combiner memory 52. The quadrature-phase adder 51 is coupled between the quadrature-phase-product device 48 and the combiner memory 52. The in-phase adder 49 and the quadrature-phase adder 51 are coupled to the in-phase output and quadrature-phase output of the matched-filter means. A header-pattern generator 58 may be coupled between the header memory 44 and the combining means. The output of the combiner memory 52 is coupled to a demodulator 59.

The header-pattern generator 58 outputs a header pattern. The header pattern includes each header-detection signal, i.e., each in-phase and quadrature-phase header amplitude and respective chip location. The header-pattern generator coordinates timing so that a respective header amplitude or a signal having the weight of the header amplitude is present at the respective in-phase-product device 47 and quadrature-phase-product device 48, with respect to timing of the data-detection signal of the data portion of the packet. The product means multiplies the plurality of header amplitudes (in-phase and quadrature-phase components) of the plurality of header-detection signals by the plurality of data amplitudes (in-phase and quadrature-phase components, respectively) of the plurality of data-detection signals, respectively. The multiplication takes place at corresponding chip locations of the header-detection signal, respectively. The product means thereby generates a plurality of weighted elements having in-phase and quadrature-phase components for each data symbol of the data-symbol-sequence signal within the data portion of the packet.

For each data symbol in the data portion of the packet, the in-phase component and the quadrature-phase component of the plurality of weighted elements are successively added by in-phase adder 49 and quadrature-phase adder 51, and stored in the combiner memory 52 as a sum signal. The sum signal has an in-phase sum and a quadrature-phase sum.

Figure 4:
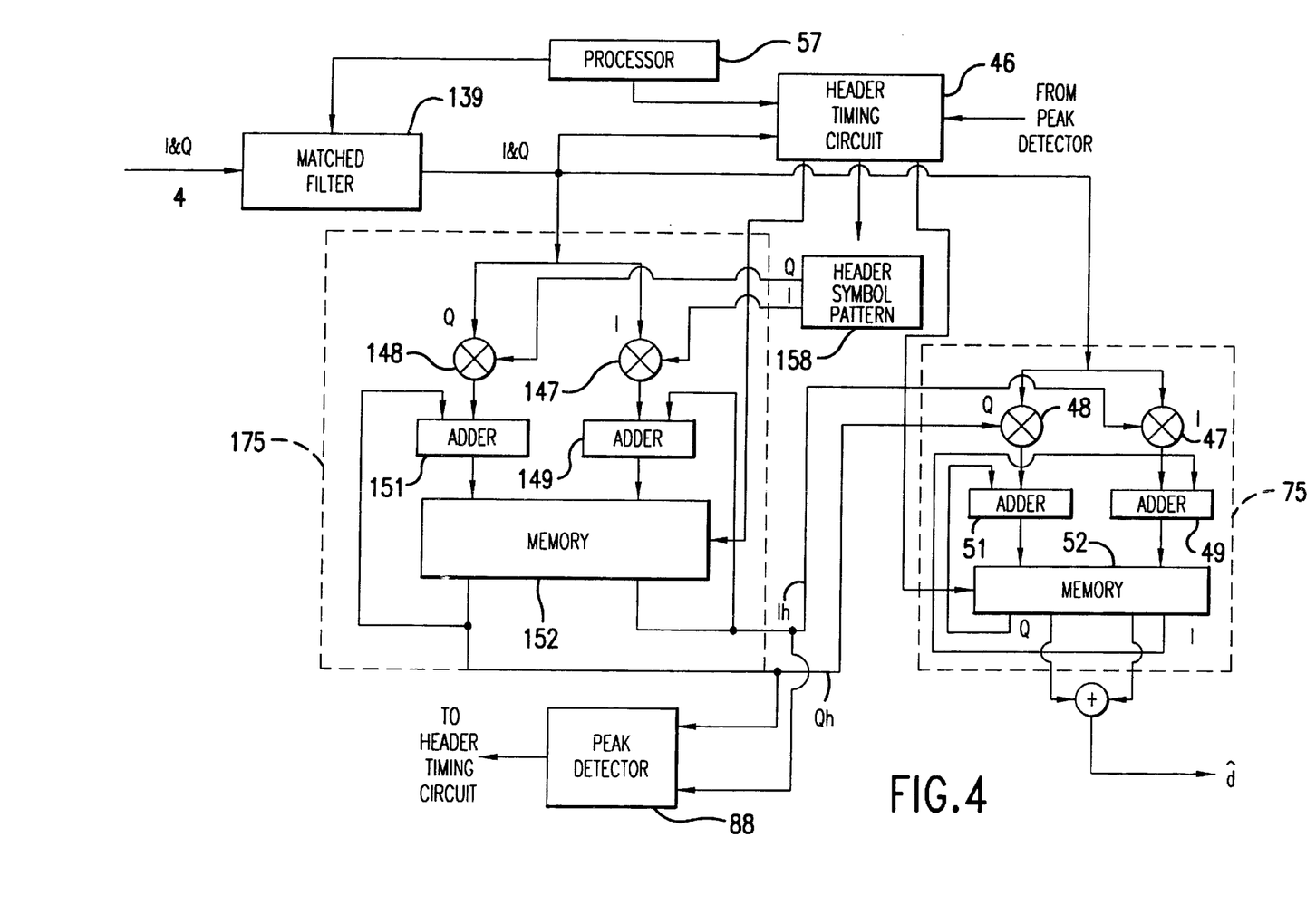
FIG. 4 is a block diagram of an alternative multipath-combining subsystem.

When the header is generated from spread-spectrum processing a header-symbol-sequence signal with a header-chip-sequence signal, the present invention may further include a correlator 175 for detecting the header-symbol-sequence signal. As shown in FIG. 4, the matched-filter means includes the matched filter 139 which has an impulse response matched to the chip-sequence signal embedded in the spread-spectrum signal. In this embodiment, by way of example, the chip-sequence signal embedded in the spread-spectrum signal would be the same for the header signal and the data, i.e., the header-chip-sequence signal and the data-chip-sequence signal would be identical. Alternatively, the matched-filter means may include a programmable matched filter, which has an impulse response that changes or alternates between matching the header-chip-sequence signal and matching the data-chip-sequence signal.

When the spread-spectrum signal includes the header-symbol-sequence signal and the chip-sequence signal at the input of the matched filter 139, then, after despreading the spread-spectrum signal by the matched filter 139, the header-symbol-sequence signal is present at the output of the matched filter 139. The correlator 175 combines the symbols, e.g., correlates the header-symbol-sequence signal when present at the output of the matched filter 139.

A header-symbol-pattern generator 158 outputs a replica of the header-symbol-sequence signal. The correlator 175 includes a quadrature-phase product device 148 and an in-phase product device 147, which are each coupled to the output of the matched filter 139 and to the header-symbol-pattern generator 158. An in-phase adder 149 and a quadrature-phase adder 151 are coupled to the output of the in-phase product device 147 and the quadrature-phase product device 148, respectively. A memory 152, which may be a register, is coupled to the outputs of the in-phase adder 149 and the quadrature-phase adder 151, and to the inputs of the in-phase adder 149 and the quadrature-phase adder 151. The output of the memory 152 is coupled to a peak detector 88 and to the in-phase product device 47 and the quadrature-phase product device 48, respectively. The peak detector 88 is coupled to the header-timing circuit 46.

The header-symbol pattern generator 158 outputs the replica of the header-symbol-sequence signal. From the output of the matched filter 139, the in-phase product device 147 and the quadrature-phase product device 148 multiply the in-phase component and the quadrature-phase component, respectively, of the replica of the header-symbol-sequence signal generated by the header-symbol-patter generator 158, by the in-phase and the quadrature-phase outputs of the matched filter 139, respectively. The header-timing circuit 46 coordinates timing with the header-symbol pattern generator 158 so that a respective header amplitude of a signal coming out of the output of the matched filter 139 corresponding to the header-symbol-sequence signal is present at the respective in-phase-product device 147 and quadrature-phase-product device 148.

The in-phase adder 149, the quadrature-phase adder 151, and the memory 152 combine the detected header-symbol-sequence signal to generate an in-phase header-symbol sum, Ih, and a quadrature-phase header-symbol sum, Qh. When multipath is present, more than one set of the in-phase header-symbol sum and quadrature-phase header-symbol sum is generated. Typically, for a particular header-symbol-sequence signal, each path of the multipath generates a set of in-phase header-symbol sum and quadrature-chase header-symbol sum.

Figure 5:
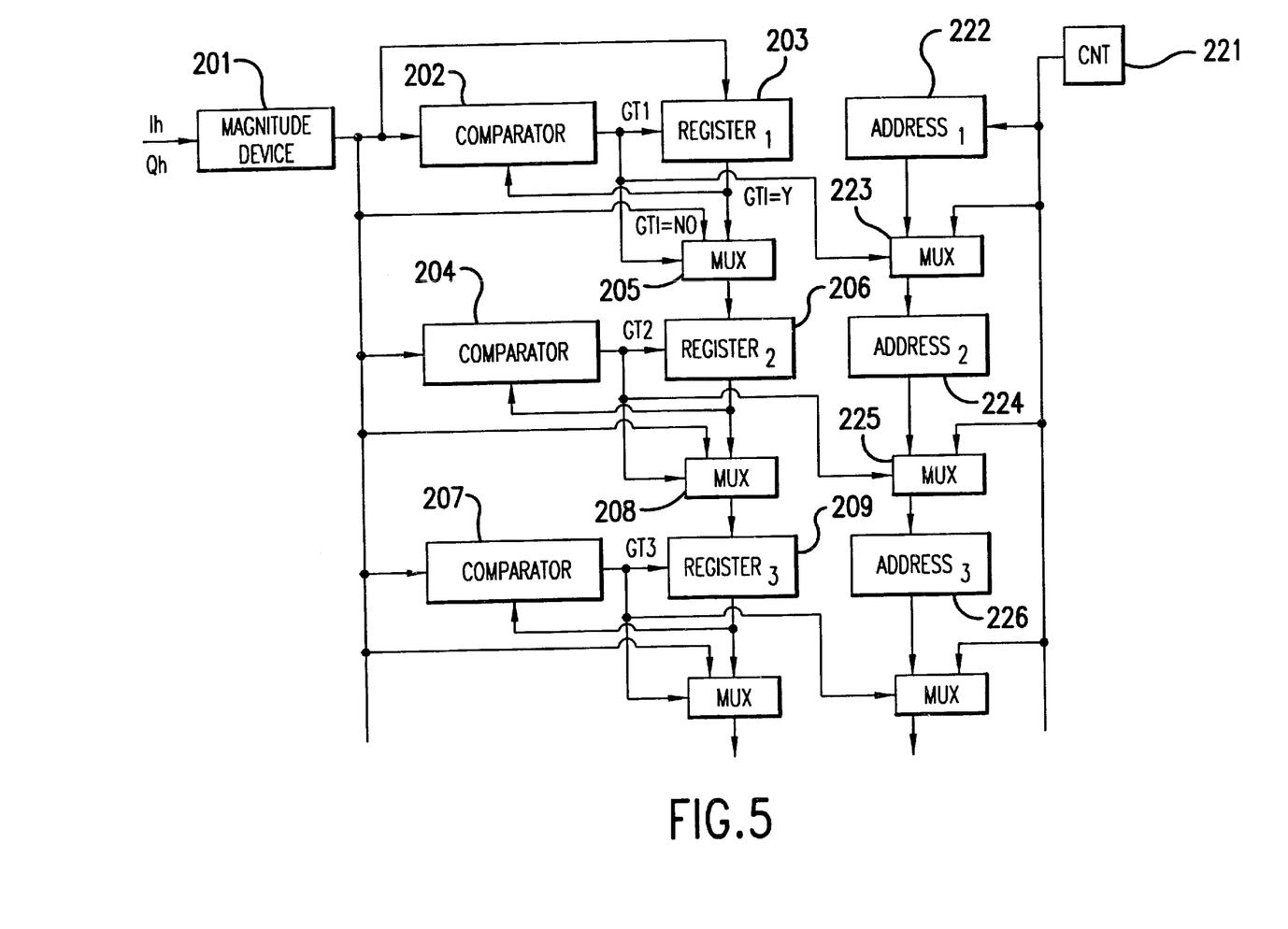
FIG. 5 is a block diagram for locating, simultaneously, N largest fingers of a RAKE system.

The peak detector 88 may include a processor or circuits embodying the logic shown in FIG. 5. In this case, the processor or circuit detects N fingers or paths of a multipath system.

Initially, a magnitude device 201 or algorithm determines a magnitude for each set of in-phase header-symbol sum and quadrature-phase header-symbol sum. A header-symbol-sequence signal having multipath would generate a plurality of sets of in-phase header-symbol sums and quadrature-phase header-symbol sums and, as a consequence, the magnitude device 201 would output a plurality of magnitudes, respectively. Each of the plurality of magnitudes arriving sequentially is denoted as a first magnitude, a second magnitude, a third magnitude, etc. Each magnitude corresponds to a path of the multipath.

FIG. 5 shows, by way of example, the circuitry or logic for detecting three strongest magnitudes, corresponding to the three strongest paths. This circuitry may be extended to any number of paths within the size of the matched filter 139. With this circuitry, the four strongest paths may be found in one bit time which may be, for example, 240 chips.

The first register 203 stores the magnitude from the strongest path, the second register 206 stores the magnitude from the second strongest path, and the third register 209 stores the magnitude from the third strongest path.

More particularly, the magnitude device 201 determines a magnitude from each set of the in-phase header-symbol sum and the quadrature-phase header-symbol sum from the correlator 175. The first register 203, the second register 206, and the third register 209 are all set to zero. The first magnitude enters the first comparator 202 and is compared to the level stored in the first register 203, which is zero. Since the first magnitude is greater than zero, the first magnitude is stored in the first register 203. The first address, timing or index of the first magnitude is stored in the first address register 222. The first address, timing or index of the first magnitude is determined from a counting circuit 221.

When the second magnitude comes from magnitude device 201, the second magnitude is compared by comparator 202 to the level of the first magnitude, the value stored in the first register 203. If the second magnitude were greater than the level of the first magnitude, stored in the first register 203, then the first magnitude passes through the multiplexer 205 to the second register 206, and the second magnitude is stored in the first register 203. At the same time, the first address register 222 now stores the second address, timing or index of the second magnitude, and the second address register 224 stores the first address, timing or index of the first magnitude. The first address passes through the multiplexer 223 to the second address register 224.

If a third magnitude came from magnitude device 201, then the third magnitude is compared with the value or level stored in the first register 203 by the first comparator 202, with the value or level stored in the second register 206 by the second comparator 204, and with the value or level stored in the third register 209 by the third comparator 207. If the third magnitude were greater than the level of the second magnitude, then the first magnitude passes through the multiplexer 208 to the third register 209 and the second magnitude passes through the multiplexer 205 to the second register 206. The third magnitude is stored in the first register 203. The first address register 222 now stores the third address, timing or index of the third magnitude, the second address register 224 stores the second address, timing or index of the second magnitude, and the third address register 226 stores the first address, timing or index of the first magnitude. The second address passes through the multiplexer 223 to the second address register 224, and the first address passes through the multiplexer 225 to the third address register 226.

If the third magnitude were less than the level of the second magnitude but greater than the level of the first magnitude, then the first magnitude passes through the multiplexer 208 to the third register 209 and the third magnitude is stored in the second register 206. The second address register 224 now stores the third address, timing or index of the third magnitude, and the third address register 226 stores the first address, timing or index of the first magnitude. The first address passes through the multiplexer 225 to the third address register 226.

If the third magnitude were less than the level stored in the first register 203 as determined by first comparator 202, and less than the level stored in the second register 206 as determined by second comparator 204, but the third magnitude were greater than the level value stored in the third register 209, then the third magnitude is stored in the third register or 209. The third address, timing or index of the third magnitude then passes straight to the third address register 226. The process continues until the largest levels of the magnitudes from the combiner 175 are stored in first register 203, second register 206 and third register 209. These largest levels are used by the header-timing circuit for determining the peak levels from the data.

The mathematical representation of the algorithm is as follows:
Step 1

$$Ih_{mp} = \sum_{i=1}^{10} (I_{loc(mp)} * Hdr_i)$$

$$Qh_{mp} = \sum_{i=1}^{10} (Q_{loc(mp)} * Hdr_i)$$

where $Ih_{mp}$ is in-phase (I) reference header at path location from mp=1 to 240

$Qh_{mp}$ is quadrature-phase (Q) reference header at path location from mp=1 to 240

$Hdr_i$ is 10 predefined header information
Step 2
Calculate the signal-to-noise ratio (SNR) on each path $$SNR_{loc(mp)} = (Ih_{mp} * Ih_{mp} + Qh_{mp} * Qh_{mp})$$

Step 3
Find largest four $SNR_{loc(mp)}$ (i.e., the strongest path)
Step 4
Combine the four strongest paths $$I_c = (Ih_{mp1} * I_{mp1}) + (Ih_{mp2} * I_{mp2}) + (Ih_{mp3} * I_{mp3}) + (Ih_{mp4} * I_{mp4})$$

$$Q_c = (Qh_{mp1} * Q_{mp1}) + (Qh_{mp2} * Q_{mp2}) + (Qh_{mp3} * Q_{mp3}) + (Qh_{mp4} * Q_{mp4})$$

$$\hat{d} = I_c + Q_c$$

The present invention also includes a multipath-combining method for use with a spread-spectrum receiver for receiving a spread-spectrum signal arriving at different times from a plurality of paths. The multipath-combining method comprises the steps of detecting, with a first impulse response matched to the header-chip-sequence signal of the header embedded in the spread-spectrum signal, within a packet for each path, each match of the header-chip-sequence signal with a first impulse response. To be considered a sufficient match, the correspondence between the header-chip-sequence signal and the first impulse response must be above a specified threshold. When the header-threshold is met, a header-detection signal is generated having a header amplitude and a respective chip location. The method further includes the step of storing the header amplitude and the respective chip location of each header-detection signal.

With a second impulse response matched to the data-chip-sequence signal embedded in the data portion of the spread-spectrum signal, the method includes the steps of detecting, at each respective chip location of each header-detection signal for each path, each match of the data-chip-sequence signal with the second impulse response. In response to each detected match, the method outputs a data detection signal having a data amplitude. The method further includes multiplying the header amplitude of each header-detection signal with the data amplitude of each data-symbol-sequence signal at each corresponding chip location, respectively. The step of multiplying thereby generates a plurality of weighted elements for each data symbol of the data-symbol-sequence signal. The plurality of weighted elements for each data symbol are added to generate a sum signal of the respective data symbol.

The method may further include the step of generating a header pattern in response to each occurrence of the header-detection signal within a frame of the header-chip-sequence signal. Additionally, the method includes the steps of detecting data from the sum signal.

It will be apparent to those skilled in the art that various modifications can be made to the spread-spectrum multipath combining subsystem of the instant invention without departing from the scope or spirit of the invention, and it is intended that the present invention cover modifications and variations of the spread-spectrum multipath combining subsystem provided they come within the scope of the appended claims and their equivalents.

We claim:

1. A multipath-combining subsystem for use with a spread-spectrum receiver for receiving a spread-spectrum signal arriving at different times from a plurality of paths, with the spread-spectrum signal having a plurality of packets with each packet having a header followed by a data portion, with the header including a header-chip-sequence signal, and with the data portion including a data-symbol-sequence signal, with each data symbol of the data-symbol-sequence signal spread-spectrum processed by a data-chip-sequence signal, said multipath-combining subsystem comprising:

matched-filter means, coupled to said spread-spectrum receiver, having a first impulse response matched to the header-chip-sequence signal of the header embedded in the spread-spectrum signal, for detecting, within a packet and for each path of the spread-spectrum signal, each match of the header-chip-sequence signal with the first impulse response, with a time difference between receiving each path of the spread-spectrum signal greater than a time of each chip of the header-chip-sequence signal and greater than a time of each chip of the data-chip-sequence signal, and for outputting, responsive to a detected match having a correspondence between the header-chip-sequence signal and the first impulse response above a header threshold, a header detection signal having an in-phase-header amplitude and a quadrature-phase-header amplitude and a respective chip location;

header-memory means, coupled to said matched-filter means, for storing the in-phase-header amplitude and the quadrature-phase-header amplitude of each header-detection signal and the respective chip location of each header-detection signal;

said matched-filter means having a second impulse response matched to the data-chip-sequence signal of the data portion embedded in the spread-spectrum signal, for detecting, at the respective chip location of each header-detection signal for each path, each match of the data-chip-sequence signal with the second impulse response, and for outputting, responsive to each detected match, a data-detection signal having an in-phase-data amplitude and a quadrature-phase data amplitude; and combining means, coupled to said header-memory means and to said matched-filter means, for multiplying the in-phase-header amplitude and the quadrature-phase-header amplitude of each header-detection signal by the in-phase-data amplitude and the quadrature-phase-data amplitude of each data-detection signal at each corresponding chip location, respectively, thereby generating a plurality of in-phase-weighted elements and a plurality of quadrature-phase-weighted elements for each data symbol within the data portion, and for combining the plurality of in-phase-weighted elements and the plurality of quadrature-phase-weighted elements of a respective data symbol as a sum signal of the respective data symbol.

2. The multipath-combining subsystem as set forth in claim 1 wherein said combining means includes:

product means for multiplying the in-phase-header amplitude and the quadrature-phase-header amplitude of each header-detection signal by the in-phase-data amplitude and the quadrature-phase-date amplitude of each data-detection signal, at each corresponding chip location, respectively, thereby generating the plurality of in-phase-weighted elements and the plurality of quadrature-phase-weighted elements for each data symbol of the data-symbol-sequence signal;

a combiner memory for storing the plurality of in-phase-weighted elements and the plurality of quadrature-phase-weighted elements; and adding means for adding each in-phase-weighted element of the plurality of in-phase-weighted elements, and for adding each quadrature-phase-weighted element of the plurality of quadrature-phase-weighted elements for each data symbol to generate the sum signal of the respective data symbol.

3. The multipath-combining subsystem as set forth in claim 1 further including:

a header-pattern generator, responsive to the header-detection signal, for generating a header pattern; and said matched-filter means, responsive to the header pattern, for detecting each match of the data-chip-sequence signal with the second impulse response.

4. The multipath-combining subsystem as set forth in claim 3 wherein said combining means includes:

product means for multiplying the in-phase-header amplitude and the quadrature-phase-header amplitude of each header-detection signal by the in-phase-data amplitude and the quadrature-phase-data amplitude of each data-detection signal, at each corresponding chip location, respectively, thereby generating the plurality of in-phase-weighted elements and the plurality of quadrature-phase-weighted elements for each data symbol of the data-symbol-sequence signal;

a combiner memory for storing the plurality of in-phase-weighted elements and the plurality of quadrature-phase-weighted elements; and adding means for adding each in-phase-weighted element of the plurality of in-phase-weighted elements, and for adding each quadrature-phase-weighted element of the plurality of quadrature-phase-weighted elements for each data symbol to generate the sum signal of the respective data symbol.

5. The multipath-combining subsystem as set forth in claim 1 further including a demodulator, coupled to said combining means, for detecting data from the sum signal.

6. The multipath-combining subsystem as set forth in claim 1 further including:

a header-timing circuit for detecting, from a plurality of header-detection signals, a strongest header-detection signal and, responsive to the strongest header-detection signal, for outputting a packet-start signal; and said matched-filter means, responsive to the packet-start signal, for changing the first impulse response to the second impulse response.

7. The multipath-combining subsystem as set forth in claim 1 wherein said matched-filter means includes:
- a header-matched filter, coupled to said spread-spectrum receiver, having the first impulse response matched to the header-chip-sequence signal of the header embedded in the spread-spectrum signal, for detecting, within each packet and for each path of the spread-spectrum signal, each match of the header-chip-sequence signal with the first impulse response, and for outputting, responsive to a detected match having a level of correspondence above the header threshold, the header-detection signal having the in-phase-header amplitude and the quadrature-phase-header amplitude and a respective chip location; and
- a data-matched filter, having the second impulse response matched to the data-chip-sequence signal of the data portion embedded in the spread-spectrum signal, for detecting, at the respective chip location of each header-detection signal for each path, each match of the data-chip-sequence signal with the second impulse response, and for outputting, responsive to each detected match, the in-phase-data amplitude and the quadrature-phase-data amplitude of the data-detection signal.

8. The multipath-combining subsystem as set forth in claim 1 wherein said matched-filter means includes:
- a programmable-matched filter, coupled to said spread-spectrum receiver, having the first impulse response initially matched to the header-chip-sequence signal of the header embedded in the spread-spectrum signal, for detecting, within each packet and for each path of the spread-spectrum signal, each match of the header-chip-sequence signal with the first impulse response, and for outputting, responsive to a detected match having a level of correspondence above the header threshold, a header detection signal having the in-phase-header amplitude and the quadrature-phase-header amplitude and a respective chip location; and
- said programmable-matched filter, having the second impulse response matched to the data-chip-sequence signal of the data portion embedded in the spread-spectrum signal, for detecting, at the respective chip location of each header-detection signal for each path, each match of the data-chip-sequence signal with the second impulse response, and for outputting, responsive to each detected match, the in-phase-data amplitude and the quadrature-phase-date amplitude of the data-detection signal.

9. The multipath-combining subsystem as set forth in claim 7 wherein said combining means includes:
- product means for multiplying the header amplitude of each header-detection signal by the data amplitude of each data-detection signal, at each corresponding chip location, respectively, thereby generating the plurality of in-phase-weighted elements and the plurality of quadrature-phase-weighted elements for each data symbol of the data-symbol-sequence signal;
- a combiner memory for storing the plurality of in-phase-weighted elements and the plurality of quadrature-phase-weighted elements; and
- adding means for adding each in-phase-weighted element of the plurality of in-phase-weighted elements, and for adding each quadrature-phase-weighted element of the plurality of quadrature-phase-weighted elements for each data symbol to generate the sum signal of the respective data symbol.

10. A multipath-combining subsystem for use with a spread-spectrum receiver for receiving a spread-spectrum signal arriving at different times from a plurality of paths, with the spread-spectrum signal having a plurality of packets with each packet having a header followed by a data portion, with the header including a header-chip-sequence signal, and with the data portion including a data-symbol-sequence signal, with each data symbol of the data-symbol-sequence signal spread-spectrum processed by a data-chip-sequence signal, said multipath-combining subsystem comprising:
- a header-matched filter, coupled to said spread-spectrum receiver, having a first impulse response matched to the header-chip-sequence signal of the header embedded in the spread-spectrum signal, for detecting, within a packet and for each path of the spread-spectrum signal, each match of the header-chip-sequence signal with the first impulse response, with a time difference between receiving each path of the spread-spectrum signal greater than a time of each chip of the header-chip-sequence signal and greater than a time of each chip of the data-chip-sequence signal, and for outputting, responsive to a detected match having a correspondence between the header-chip-sequence signal and the first impulse response above a header threshold, a header detection signal having an in-phase-header amplitude and a quadrature-phase-header amplitude and a respective chip location;
- a header memory, coupled to said header-matched filter, for storing the in-phase-header amplitude and the quadrature-phase-header amplitude of each header-detection signal and the respective chip location of each header-detection signal;
- a symbol-matched filter, having a second impulse response matched to the data-chip-sequence signal of the data portion embedded in the spread-spectrum signal, for detecting, at the respective chip location of each header-detection signal for each path, each match of the data-chip-sequence signal with the second impulse response, and for outputting, responsive to each detected match, a data-detection signal having an in-phase-data amplitude and a quadrature-phase data amplitude;
- a header-timing circuit, coupled to an output of said header-matched filter, for detecting, from a plurality of header-detection signals, a strongest header-detection signal and, responsive to the strongest header-detection signal, for outputting a packet-start signal;
- product means, coupled to an output of said header-matched filter and to an output of said header-timing circuit, for multiplying the in-phase-header amplitude and the quadrature-phase-header amplitude of each header-detection signal by the in-phase-data amplitude and the quadrature-phase-data amplitude of each data-detection signal, at each corresponding chip location, respectively, thereby generating the plurality of in-phase-weighted elements and the plurality of quadrature-phase-weighted elements for each data symbol of the data-symbol-sequence signal;
- adding means, coupled to an output of said product means, for adding the plurality of in-phase-weighted elements and the plurality of quadrature-phase-weighted elements for a respective data symbol to generate a sum signal of the respective data symbol;
- a combiner memory, coupled to an output of said adding means, for storing the sum signal; and
- a data demodulator, coupled to said combiner memory, for detecting data from the sum signal.

11. A multipath-combining subsystem for use with a spread-spectrum receiver for receiving a spread-spectrum signal arriving at different times from a plurality of paths, with the spread-spectrum signal having a plurality of packets with each packet having a header followed by a data portion, with the header including a header-chip-sequence signal, and with the data portion including a data-symbol-sequence signal, with each data symbol of the data-symbol-sequence signal spread-spectrum processed by a data-chip-sequence signal, said multipath-combining subsystem comprising:

- a programmable-matched filter, coupled to said spread-spectrum receiver, having a first impulse response matched to the header-chip-sequence signal of the header embedded in the spread-spectrum signal, for detecting, within a packet and for each path of the spread-spectrum signal, each match of the header-chip-sequence signal with the first impulse response, with a time difference between receiving each path of the spread-spectrum signal greater than a time of each chip of the header-chip-sequence signal and greater than a time of each chip of the data-chip-sequence signal, and for outputting, responsive to each detected match above a header threshold, an in-phase-header amplitude and a quadrature-phase-header amplitude and a respective chip location;

- a header memory, coupled to said programmable-matched filter, for storing the in-phase-header amplitude and the quadrature-phase-header amplitude and the respective chip location of each header-detection signal;

- a header-timing circuit, coupled to an output of said programmable-matched filter, for detecting, from a plurality of header-detection signals, a strongest header-detection signal and, responsive to the strongest header-detection signal, for outputting a packet-start signal;

- said programmable-matched filter, responsive to the packet-start signal, for changing the first impulse response to a second impulse response, the second impulse response matched to the data-chip-sequence signal of the data portion embedded in the spread-spectrum signal, for detecting, at the respective chip location of each in-phase-header-detection signal and of each quadrature-phase-header-detection signal for each path, each match of the data-chip-sequence signal with the second impulse response, and for outputting, responsive to each detected match, a data-detection signal having an in-phase-data amplitude and a quadrature-phase data amplitude;

- product means, coupled to an output of said header-matched filter and to an output of said header-timing circuit, for multiplying the in-phase-header amplitude and the quadrature-phase-header amplitude of each header-detection signal by the in-phase-data amplitude and the quadrature-phase-data amplitude of each data-detection signal, at each corresponding chip location, respectively, thereby generating the plurality of in-phase-weighted elements and the plurality of quadrature-phase-weighted elements for each data symbol of the data-symbol-sequence signal;

- adding means, coupled to an output of said product means, for adding the plurality of in-phase-weighted elements and the plurality of quadrature-phase-weighted elements for a respective data symbol to generate a sum signal of the respective data symbol;

- a combiner memory, coupled to an output of said adding means, for storing the sum signal; and

- a data demodulator, coupled to said combiner memory, for detecting data from the sum signal.

12. A multipath-combining method for use with a spread-spectrum receiver for receiving a spread-spectrum signal arriving at different times from a plurality of paths, with the spread-spectrum signal having a plurality of packets with each packet having a header followed by a data portion, with the header including a header-chip-sequence signal, and with the data portion including a data-symbol-sequence signal, with each data symbol of the data-symbol-sequence signal spread-spectrum processed by a data-chip-sequence signal, said multipath-combining method comprising the steps of:

a. detecting, with a first impulse response matched to the header-chip-sequence signal of the header embedded in the spread-spectrum signal, within a packet and for each path, each match of the header-chip-sequence signal with the first impulse response, with a time difference between receiving each path of the spread-spectrum signal greater than a time of each chip of the header-chip-sequence signal;

b. outputting, in response to each detected match above a header threshold, a header-detection signal having an in-phase-header amplitude and a quadrature=-phase-header amplitude and a respective chip location;

c. storing the in-phase-header amplitude and the quadrature-phase-header amplitude and the respective chip location of each header-detection signal;

d. detecting, with a second impulse response matched to the data-chip-sequence signal embedded in the data portion of the spread-spectrum signal, at the respective chip location of each header-detection signal for each path, each match of the data-chip-sequence signal with the second impulse response;

e. outputting, responsive to each detected match, a data-detection signal having an in-phase-data amplitude and a quadrature-phase-data amplitude;

f. multiplying the in-phase-header amplitude and the quadrature-phase-header amplitude of each header-detection signal with the in-phase-data amplitude and the quadrature-phase-data amplitude of each data-detection-signal at each corresponding chip location, respectively, thereby generating a plurality of in-phase-weighted elements and a plurality of quadrature-phase-weighted elements for each data symbol of the data-symbol-sequence signal; and g. adding the plurality of in-phase-weighted elements and the plurality of quadrature-phase-weighted elements for a respective data symbol as a sum signal of the respective data symbol.

13. The multipath-combining method as set forth in claim 12, wherein the step of (c) storing includes the step of buffering a plurality of header-detection signals corresponding to the plurality of paths.

14. The multipath-combining method as set forth in claim 12 further including the step of generating a header pattern responsive to each occurrence of the header-detection signal within a frame of the header-chip-sequence signal.

15. The multipath-combining method as set forth in claim 12 further including the step of detecting data from the sum signal.

16. The multipath-combining method as set forth in claim 12 further including the steps of:

h. detecting, from a plurality of header-detection signals within the packet, a strongest header-detection signal; and i. outputting, responsive to the strongest header-detection signal, a packet-start signal.

\* \* \* \* \*